US010327388B2

(12) United States Patent
Demon

(10) Patent No.: US 10,327,388 B2
(45) Date of Patent: Jun. 25, 2019

(54) AGRICULTURAL BALER WITH EXTENDED BALE EJECTION SYSTEM

(71) Applicant: CNH Industrial America LLC, New Holland, PA (US)

(72) Inventor: Frederik Demon, Bruges (BE)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 15/892,572

(22) Filed: Feb. 9, 2018

(65) Prior Publication Data

US 2018/0228091 A1 Aug. 16, 2018

(30) Foreign Application Priority Data

Feb. 10, 2017 (BE) .................. 2017/5087

(51) Int. Cl.
*A01F 15/08* (2006.01)
*B30B 9/30* (2006.01)

(52) U.S. Cl.
CPC .......... *A01F 15/0875* (2013.01); *A01F 15/08* (2013.01); *B30B 9/3014* (2013.01)

(58) Field of Classification Search
CPC ...... A01F 15/0875; A01F 15/14; A01F 15/04; A01F 15/044; B30B 9/3007; B30B 9/3014
USPC .................. 100/7, 179, 188 R, 218
See application file for complete search history.

(56) References Cited

U.S. PATENT DOCUMENTS

| 2,947,400 | A | | 8/1960 | Murray et al. |
| 4,549,840 | A | * | 10/1985 | Ansbjer ............... A01D 90/083 198/744 |
| 4,791,865 | A | * | 12/1988 | Naaktgeboren ..... A01F 15/0825 100/188 R |
| 5,540,144 | A | | 7/1996 | Schrag et al. |
| 6,134,870 | A | | 10/2000 | Lippens et al. |
| 6,431,062 | B1 | | 8/2002 | Hawlas et al. |
| 7,779,755 | B2 | | 8/2010 | De Rycke et al. |
| 8,978,550 | B2 | * | 3/2015 | Demon ............... A01F 15/0875 100/188 R |
| 9,439,358 | B2 | | 9/2016 | De Rycke et al. |

FOREIGN PATENT DOCUMENTS

| AU | 2010202940 A1 | 2/2011 |
| EP | 0771522 A1 | 5/1997 |
| EP | 2636298 A1 | 9/2013 |
| EP | 3064055 A1 | 9/2016 |
| GB | 1355045 A | 5/1974 |
| WO | 2008147177 A1 | 12/2008 |

* cited by examiner

*Primary Examiner* — Jimmy T Nguyen
(74) *Attorney, Agent, or Firm* — Peter K. Zacharias; Patrick M. Sheldrake

(57) ABSTRACT

An agricultural baler includes a main bale chamber for the compressing of crop material into bales. The main bale chamber has a floor and an outlet for discharge of compressed crop material in the form of bales. A bale ejection system is at least partially incorporated in the floor, and is arranged to move and eject a rearward bale proximate to the outlet of the main bale chamber. The baler is characterized in that the bale ejection system continuously extends longitudinally past the outlet of the main bale chamber.

6 Claims, 8 Drawing Sheets

AGRICULTURAL BALER WITH EXTENDED BALE EJECTION SYSTEM

FIELD OF THE INVENTION

The present invention relates to agricultural balers, and, more particularly, to agricultural square balers having a bale ejection system.

BACKGROUND OF THE INVENTION

Agricultural harvesting machines, such as balers, are used to consolidate and package crop material so as to facilitate the storage and handling of the crop material for later use. In the case of hay, a mower-conditioner is typically used to cut and condition the crop material for windrow drying in the sun. In the case of straw, an agricultural combine discharges non-grain crop material from the rear of the combine defining the straw (such as wheat or oat straw) which is to be picked up by the baler. The cut crop material is typically raked and dried, and a baler, such as a large square baler or round baler, straddles the windrows and travels along the windrows to pick up the crop material and form it into bales.

On a large square baler, a pickup unit at the front of the baler gathers the cut and windrowed crop material from the ground. The pickup unit includes a pickup roll, and optionally may include other components such as side shields, stub augers, wind guard, etc.

A packer unit is used to move the crop material from the pickup unit to a duct or pre-compression chamber. The packer unit forms a wad of crop within the pre-compression chamber, which is then transferred to a main bale chamber. (For purposes of discussion, the charge of crop material within the pre-compression chamber will be termed a "wad", and the charge of crop material after being compressed within the main bale chamber will be termed a "flake"). Typically such a packer unit includes packer tines or forks to move the crop material from the pickup unit into the pre-compression chamber. Instead of a packer unit it is also known to use a rotor cutter unit, which chops the crop material into smaller pieces.

A stuffer unit transfers the wad of crop material in charges from the pre-compression chamber to the main bale chamber. Typically such a stuffer unit includes stuffer forks which are used to move the wad of crop material from the pre-compression chamber to the main bale chamber, in sequence with the reciprocating action of a plunger within the main bale chamber.

In the main bale chamber, the plunger compresses the wad of crop material into flakes to form a bale and, at the same time, gradually advances the bale toward the outlet of the bale chamber. The plunger reciprocates, back and forth, toward and away from the discharge end of the baler. When enough flakes have been added and the bale reaches a full (or other predetermined) size, a number of knotters are actuated which wrap and tie twine, cord or the like around the bale while it is still in the main bale chamber. The twine is cut and the formed baled is ejected out the back of the baler as a new bale is formed.

Bale ejection systems typically move a bale through and/or out of the main bale chamber during operation of the baler. For example, EP Patent Application No. EP 16.158.730.8 (filed 4 Mar. 2016), which is assigned to the assignee of the present invention, discloses a partial bale ejection system with an actuator which drives a ram and attached tines for engagement of the tines into a rearmost bale and ejection of the bale from the outlet of bale chamber. The actuator, ram and tines are all positioned within a floor slat which extends to the outlet of the bale chamber.

What is needed in the art is an agricultural baler with a bale ejection system which effectively ejects a rearmost bale from the bale chamber to the discharge chute.

SUMMARY OF THE INVENTION

The present invention provides an agricultural baler with a bale ejection system which extends rearward of the bale chamber outlet, thereby more effectively discharging the bale onto the discharge chute.

The invention in one form is directed to an agricultural baler including a main bale chamber for the compressing of crop material into bales. The main bale chamber has a floor and an outlet for discharge of compressed crop material in the form of bales. A bale ejection system is at least partially incorporated in the floor, and is arranged to move and eject a rearward bale proximate to the outlet of the main bale chamber. The baler is characterized in that the bale ejection system continuously extends longitudinally past the outlet of the main bale chamber.

The floor can terminate at a rearward end adjacent to the outlet of the main bale chamber, and the bale ejection system can extend longitudinally past the rearward end of the floor.

The floor can include a plurality of floor slats positioned side-by-side to each other and extending toward the outlet. The bale ejection system can include an extension associated with at least one of the floor slats, the extension extending longitudinally past the rearward end of the floor.

The extension can be integral with the at least one floor slat, or separate from and attached to the at least one floor slat.

The baler can include a discharge chute positioned at the outlet of the main bale chamber for receiving a bale from the bale ejection system. The discharge chute has a pair of spaced apart side rails and a cross member extending between the side rails adjacent to the outlet of the main bale chamber. The cross member is configured to accommodate the extension which extends past the rearward end of the floor. In one embodiment, the cross member can be a plate having a cutout which receives the extension therein.

An advantage of the present invention is that the bale ejection system effectively ejects the rearmost bale onto the discharge chute.

Another advantage is that the bale ejection system can be used with minimal modifications to the discharge chute at the rear of the baler.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

Figure 1:
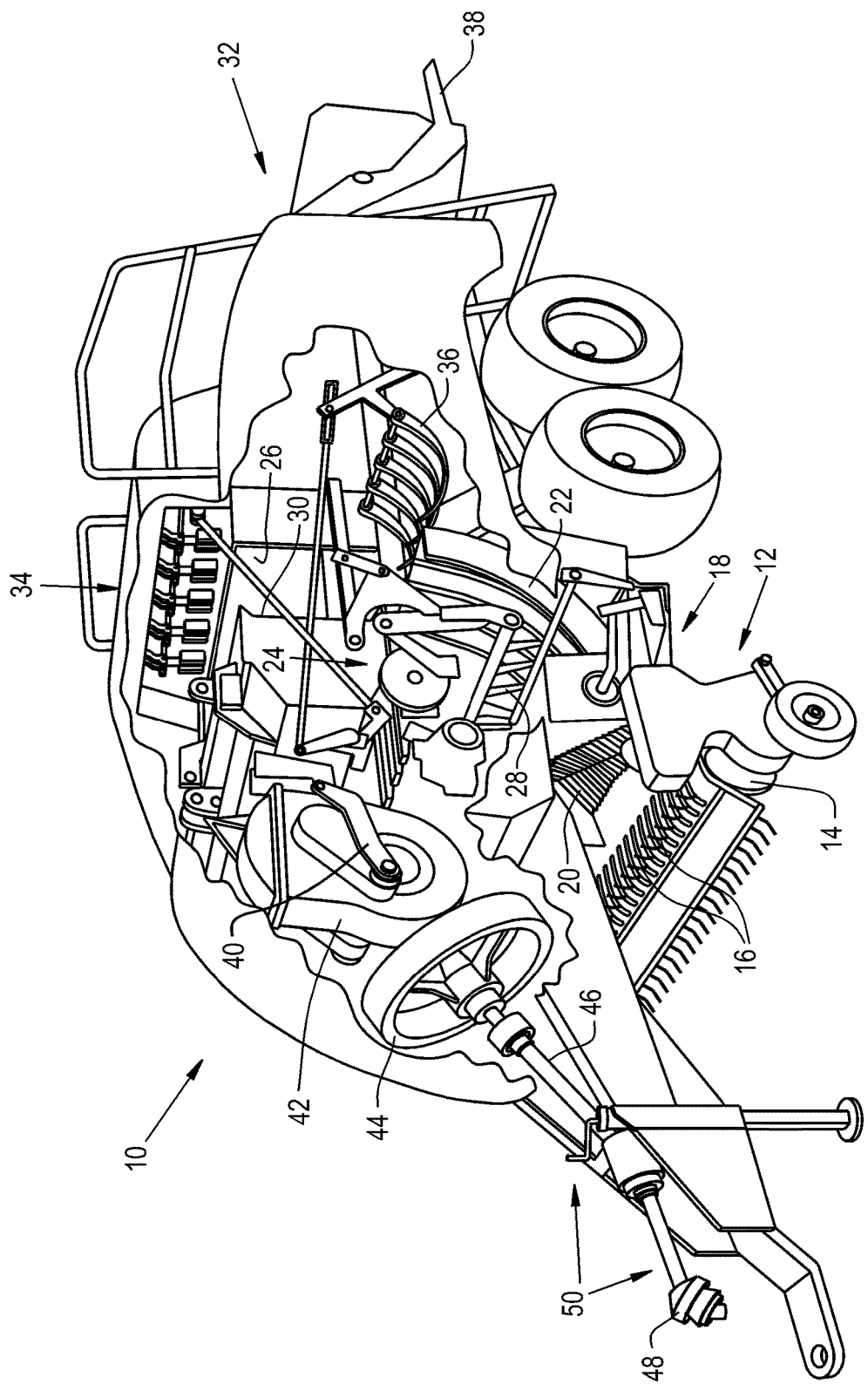
FIG. 1 is a perspective cutaway view showing the internal workings of a large square baler, which includes a bale ejection system of the present invention.

Referring now to the drawings, and more particularly to FIG. 1, there is shown a perspective cutaway view showing the internal workings of a large square baler 10. The baler 10 operates on a two stage feeding system. Crop material is lifted from windrows into the baler 10 using a pickup unit 12. The pickup unit 12 includes a rotating pickup roll 14 with tines 16 which move the crop rearward toward a packer unit 18. An optional pair of stub augers (one of which is shown, but not numbered) are positioned above the pickup roll 14 to move the crop material laterally inward. The packer unit 18 includes packer tines 20 which push the crop into a pre-compression chamber 22 to form a wad of crop material. The packer tines 20 intertwine the crop together and pack the crop within the pre-compression chamber 22. The pre-compression chamber 22 and the packer tines 20 function as the first stage for crop compression. Once the pressure in the pre-compression chamber 22 reaches a predetermined sensed value, a stuffer unit 24 moves the wad of crop from the pre-compression chamber 22 to a main bale chamber 26. The stuffer unit 24 includes stuffer forks 28 which thrust the wad of crop directly in front of a plunger 30, which reciprocates within the main bale chamber 26 and compresses the wad of crop into a flake. The stuffer forks 28 return to their original stationary state after the wad of material has been moved into the main bale chamber 26. The plunger 30 compresses the wads of crop into flakes to form a bale and, at the same time, gradually advances the bale toward an outlet 32 of the main bale chamber 26. The main bale chamber 26 and the plunger 30 function as the second stage for crop compression. When enough flakes have been added and the bale reaches a full (or other predetermined) size, knotters 34 are actuated which wrap and tie twine around the bale while it is still in the main bale chamber 26. Needles 36 bring the lower twine up to the knotters 34 and the tying process then takes place. The twine is cut and the formed bale is ejected from a discharge chute 38 as a new bale is formed.

The plunger 30 is connected via a crank arm 40 with a gear box 42. The gear box 42 is driven by a flywheel 44, which in turn is connected via a drive shaft 46 with the power take-off (PTO) coupler 48. The PTO coupler 48 is detachably connected with the PTO spline at the rear of the traction unit, such as a tractor (not shown). The PTO coupler 48, the drive shaft 46 and the flywheel 44 together define a portion of a driveline 50, which provides rotative power to the gearbox 42. The flywheel 44 has a sufficient mass to carry the plunger 30 through a compression stroke as power is applied to the drive shaft 46 by the traction unit (not shown).

Figure 2:
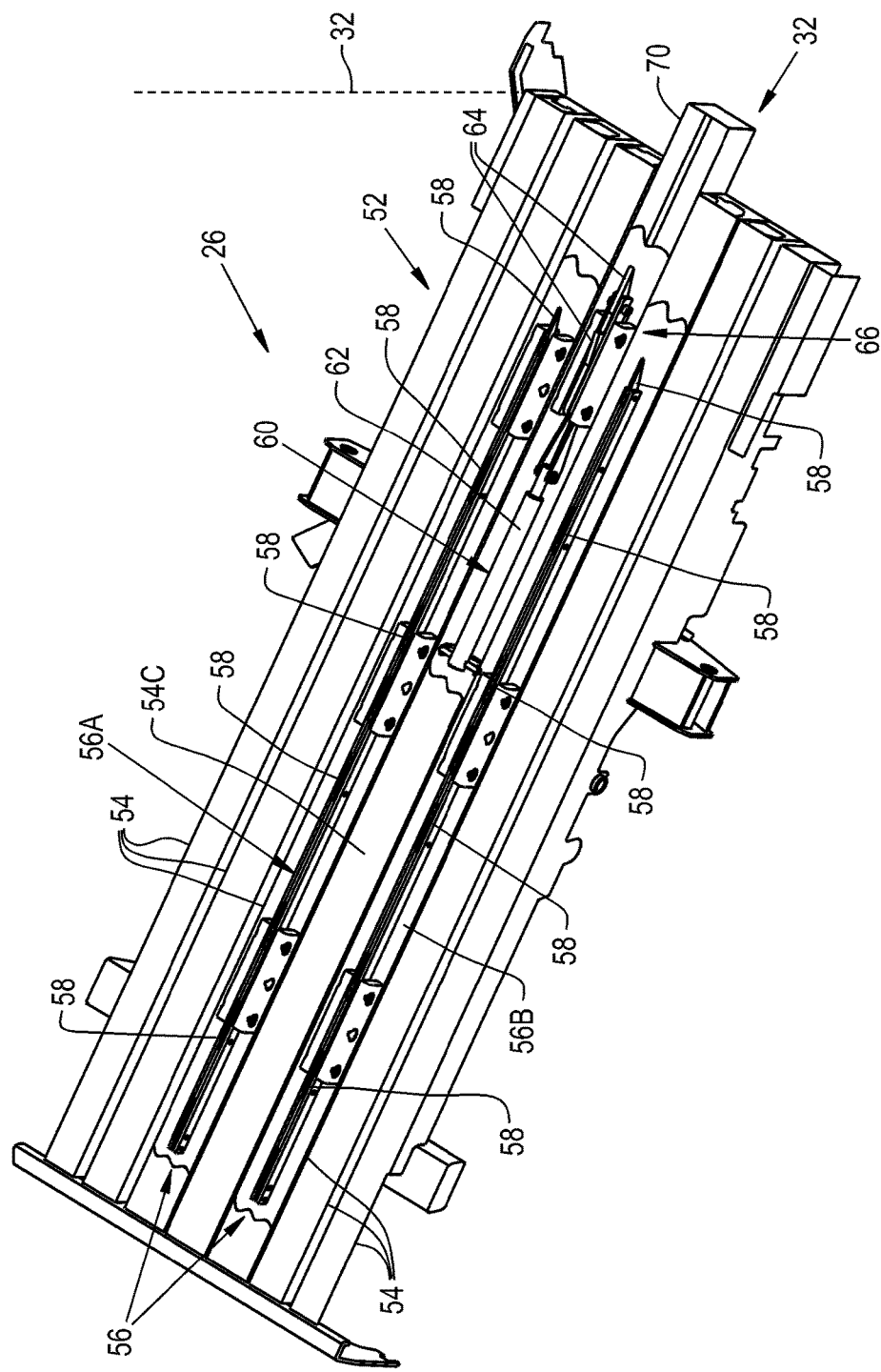
FIG. 2 is a perspective view of the floor of the main bale chamber illustrating the bale ejection system used in the baler of FIG. 1.

Now, additionally referring to FIG. 2, there is shown a partially cutout view of part of the main bale chamber 26, and more particularly a floor 52 of the main bale chamber 26. The floor 52 has several bale support members or floor slats 54 upon which the bales slide as they are formed in the baler 10. The slats 54 may have a plastic lining or insert for low friction movement of the bales. Two of the slats 54 are cutout in FIG. 2 to show a bale ejection system 56 that has two actuators (such as hydraulic cylinders, not shown) to move the bales in the main bale chamber 26. The bale ejection system 56 has multiple tines 58 located along the length of the main bale chamber 26 to engage the bales for pushing the formed bales. The tines 58 are biased upwardly so that they will engage the bale as the bale ejection system 56 pushes toward the rear of the main bale chamber 26. The tines 58, although being biased upward, disengage from the bales in a ratcheting manner relative to the bales as the bale ejection system 56 moves away from the outlet 32.

There is also illustrated another bale ejection system 60, also referred to as a partial bale ejection system 60. The term "partial" refers to the length of the system relative to the main bale chamber 26 and not to a bale that is of a smaller size. The partial bale ejection system 60 includes an actuator 62, tines 64 and a tine extension/retraction device 66. The partial bale ejection system 60 is tasked with the ejection of the rearmost bale on the floor 52 to, and out of, the outlet 32. It is contemplated that the partial bale ejection system 60 can operate independently or in coordination with the bale ejection system 56. For example, the partial bale ejection system 60 could move each time the bale ejection system 56 moved to thereby distribute the load of moving the bales. The partial bale ejection system 60 operates independent of the bale ejection system 56, in that when the baling operation in the field is complete the operator can trigger the partial bale ejection system 60 to move the most rearward bale out of the main bale chamber 26 through the outlet 32, so that the bale will not be in the baler 10 and potentially become dislodged during transport of baler 10 to another field. The partial bale ejection system 60 also serves to lighten the load carried by the baler 10 during transport by expelling the rearmost bale.

According to an aspect of the present invention, the partial bale ejection system 60 also includes an extension 70 which extends past (rearward of) the outlet 32 of the bale chamber 26 (shown schematically as a dashed line in FIG. 2). The extension 70 functions to move the rearmost bale further past the outlet 32 (compared with conventional designs), ensuring the discharge of the rearmost bale onto the discharge chute 38. In the embodiment shown in FIG. 2, the extension 70 is an integral extension of the center slat 54C associated with the partial bale ejection system 60. Thus, if the center slat 54C is a bent, extruded or otherwise formed piece, the extension 70 can likewise be a bent, extruded or otherwise formed piece that is integral with the center slat 54C. In the specific embodiment shown, the center slat 54C and extension 70 each have a generally square cross section with a slot (not numbered) formed in a portion of the length of the top surface adjacent to the bale chamber 26. The tines 64 of the bale ejection system 60 extend through the slot in the top surface. It is to be understood that the slats 54 and extension 70 can also have other suitable cross sectional shapes. Additionally, it is possible that the extension 70 can be a separate piece that is attached to the center slat 54C.

Although the partial bale ejection system 60 is shown having an extension 70, it is also to be understood that the bale ejection system 56 can also include one or more extensions which extend past the outlet 32 of the bale chamber 26. For example, the bale ejector 56A and/or 56B could include an integral or attached extension 70 which would extend past (rearward of) the outlet 32 of the bale chamber 26. Configured in this manner, the bale ejector 56A and/or 56B could also assist in ejecting a rearmost bale past the outlet 32 of the bale chamber.

For purposes of this disclosure, the outlet 32 of the bale chamber 26 is assumed to lie coincident with the rearward end of the floor 52, defined by the floor slats 54. The plurality of floor slats 54 are positioned side-by-side to each other and extend toward the outlet 32, with the extension 70 extending longitudinally past the rearward end of the floor 52 and outlet 32.

Figure 3:
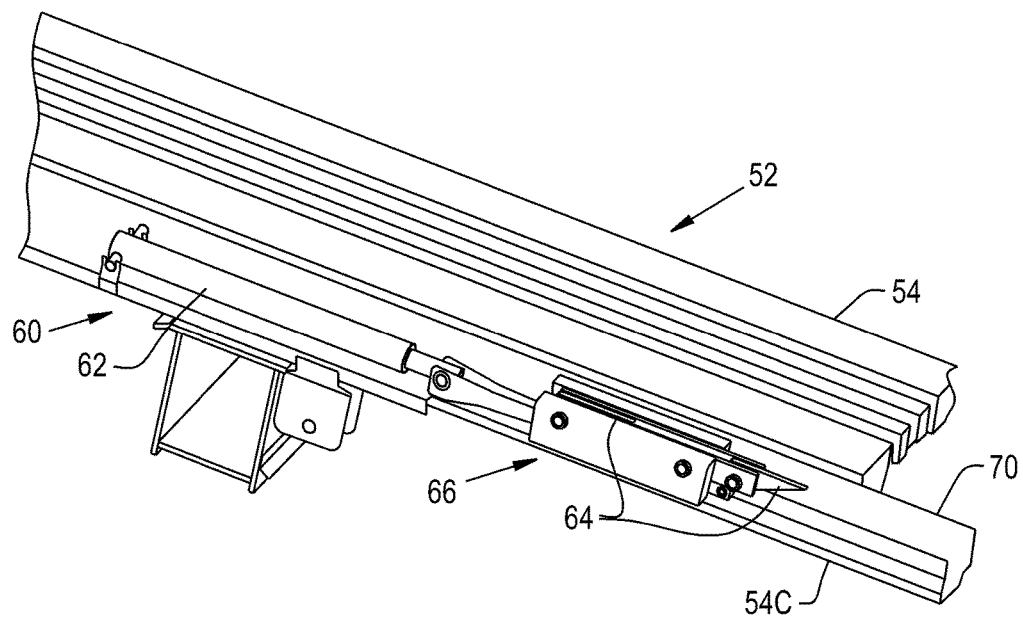
FIG. 3 is a partial cut-away view showing the bale ejection system fully retracted in the floor of FIG. 2.

Now, additionally referring to FIGS. 3-6, there is shown a sequence of events that take place during the cycling of the partial bale ejection system 60. In FIG. 3, the partial bale ejection system 60 is in a retracted, inactivated state, and the bales move on the slats 54 thereabove with the tines 64 being in a retracted position. Having the tines 64 in a retracted position advantageously prevents wearing of the tines 64 as the crop material of the bales move in a rearward direction.

Figure 4:
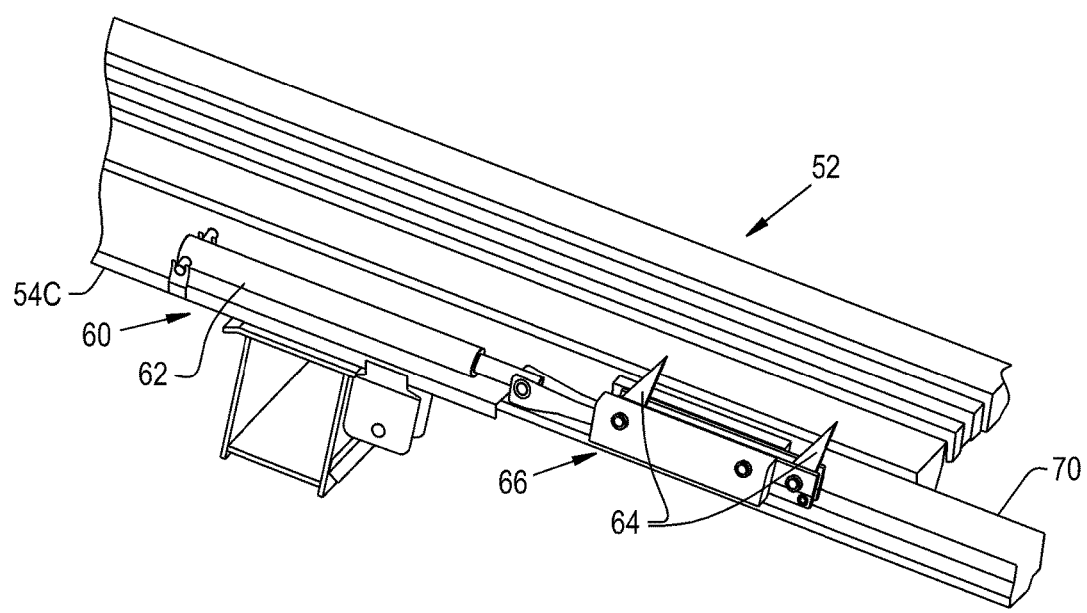
FIG. 4 is another partial cut-away view similar to FIG. 3 showing the partial bale ejection system still fully retracted in the floor of FIGS. 2 and 3, but with the tines extended.

In FIG. 4, the partial bale ejection system 60 has been activated such that the actuator 62 is in a partially extended position and the tines 64 have been extended by the extension/retraction device 66 prior to moving the bale above. The actuator 62 can be, e.g., a hydraulic cylinder under electronic control. The extension/retraction device 66 can be a separate actuator that carries this process out; however, for purposes of discussion it will be considered that the device 66 is a mechanism that is driven by the actuator 62 and causes the tines 64 to extend, which takes place prior to the actuator 62 driving the bale in a rearward direction. For example, the extension/retraction device 66 can include a spring that biases the tine 64 to an extended position.

Figure 5:
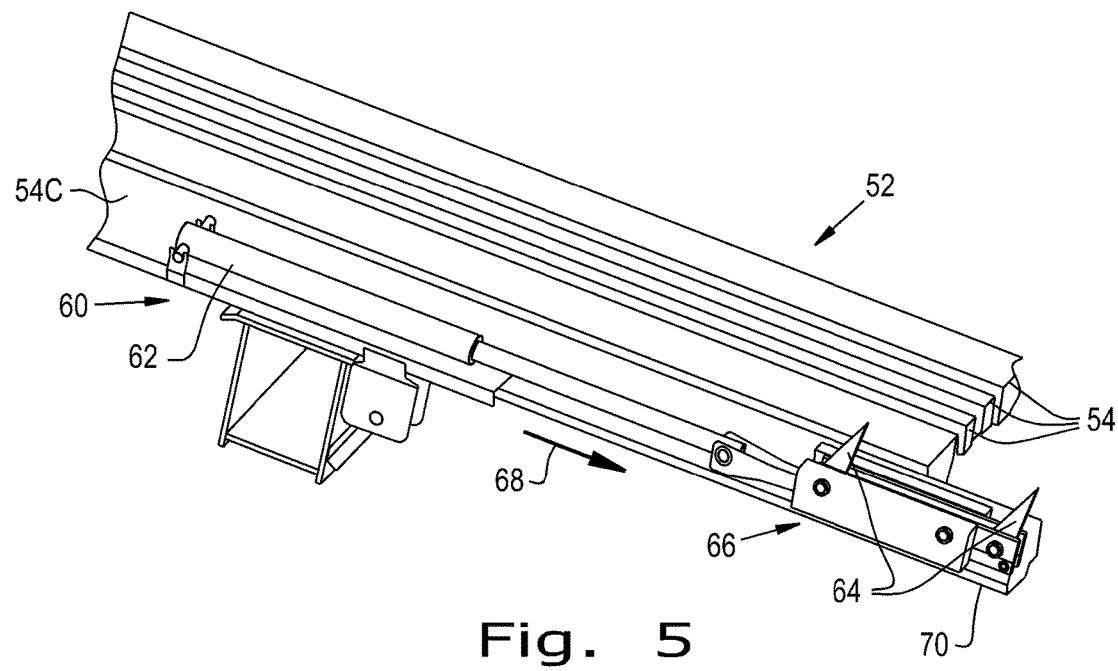
FIG. 5 is another partial cut-away view similar to FIGS. 3 and 4 showing the bale ejection system fully extended in the floor of FIGS. 2-4, with the tines extended, having ejected a rearmost bale.

In FIG. 5, the actuator 62 has been fully extended in a direction 68 and the rearmost bale that was above will have passed out of the outlet 32 and onto the discharge chute 38. The bale or bales setting forward of the rearmost bale will remain substantially in place in the main bale chamber 26.

Figure 6:
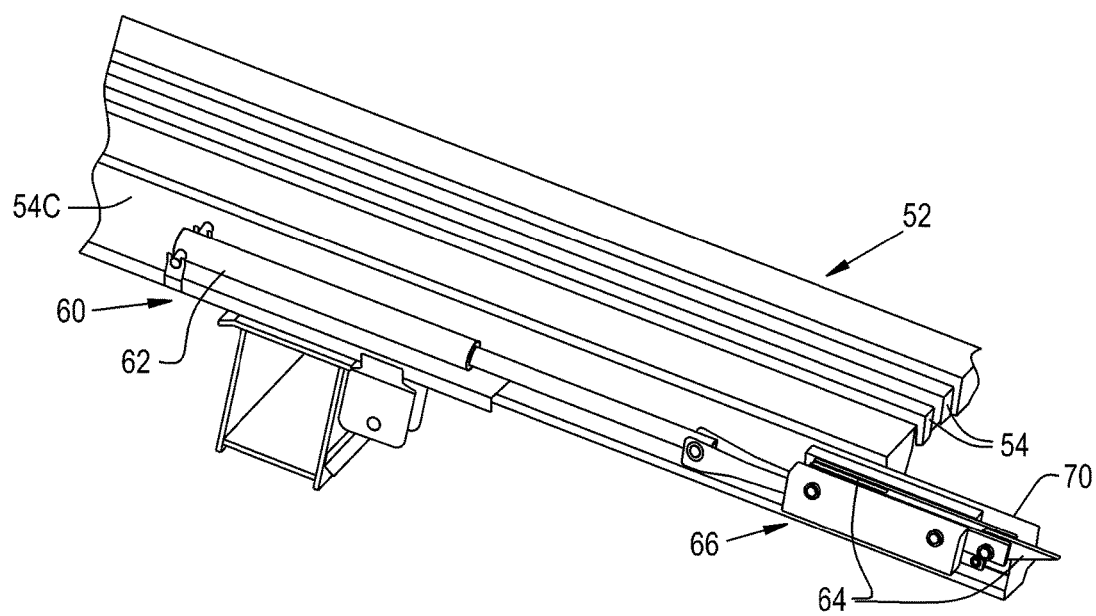
FIG. 6 is yet another partial cut-away view similar to FIGS. 3-5 showing the bale ejection system fully extended in the floor of FIGS. 2-4, with the tines retracted.

In FIG. 6, a small movement of the actuator 62 in a direction opposite of direction 68 causes the tines 64 to retract before the device 66 moves toward the front of the main bale chamber 26 as the actuator 62 retracts to the position shown in FIG. 3. Again the retraction of the tines 64 prevents wearing of the tines 64 as they are moved or as the bales move on the floor 52.

Figure 7:
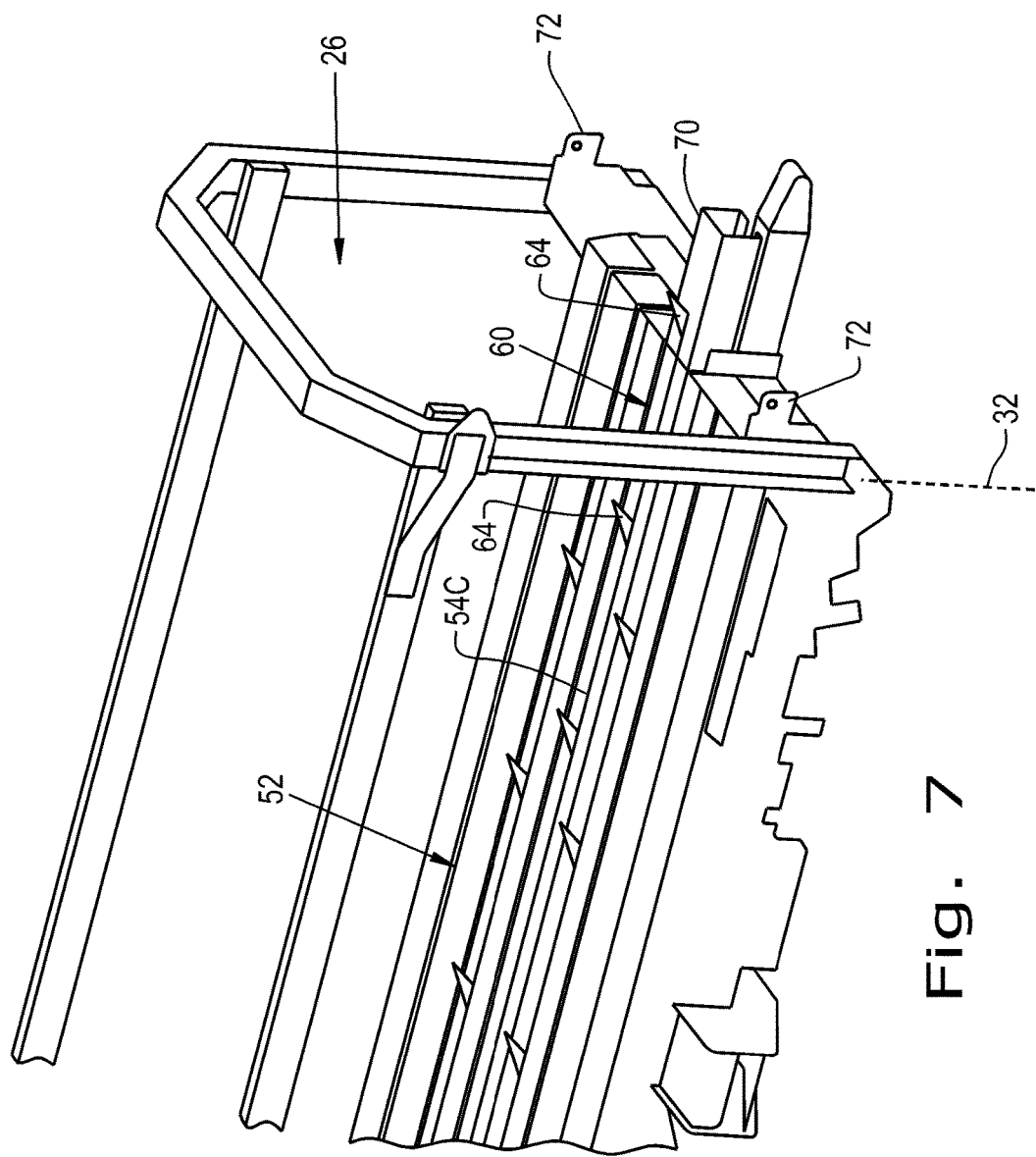
FIG. 7 illustrates another embodiment of a bale ejection system of the present invention.
Figure 8:
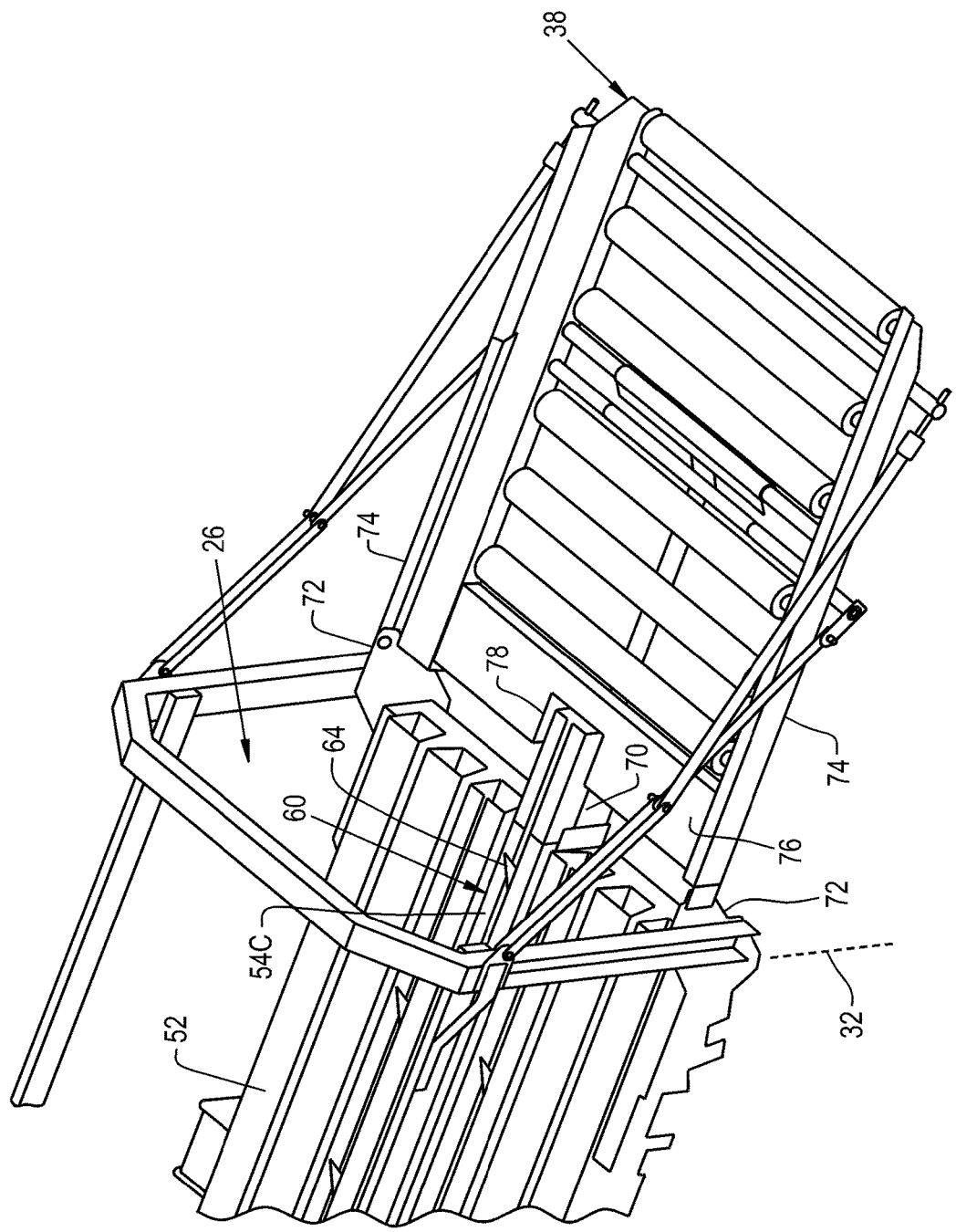
FIG. 8 illustrates the bale ejection system of FIG. 7, attached to the discharge chute at the rear of the baler.

Referring now to FIGS. 7 and 8, there is shown another embodiment of the bale ejection system 60 of the present invention. In this embodiment, the bale ejection system 60 is likewise configured as a partial bale ejection system, but differs in one aspect in that the extension 70 is separate from and attached to the center floor slat 54C.

The discharge chute 38 is positioned at the outlet 32 of the main bale chamber 26 for receiving a bale from the bale ejection system 60. In the embodiment shown, the discharge chute 38 is pivotally connected to the pair of brackets 72 at the rearward end of the floor 52. According to another aspect of the present invention, the discharge chute 38 is configured in a manner which accommodates the extension 70 of the bale ejection system 60, allowing discharge of the bale further rearward onto the discharge chute 38, while at the same time allowing folding and unfolding of the discharge chute 38.

More specifically, the discharge chute 38 has a pair of spaced apart side rails 74 (FIG. 8) and a cross member 76 extending between the side rails 74 adjacent to the outlet 32 of the main bale chamber 26. The cross member 76 is configured to accommodate the extension 70 which extends past the rearward end of the floor 52. In the illustrated embodiment, the cross member 76 is configured as a C-shaped plate having a cutout 78 which receives the extension 70 therein. The cutout 78 can be generally rectangular shaped as viewed from the top (as shown), with dimensions accommodating the extension 70, or can have a different suitable shape, depending on the application.

Figure 9:
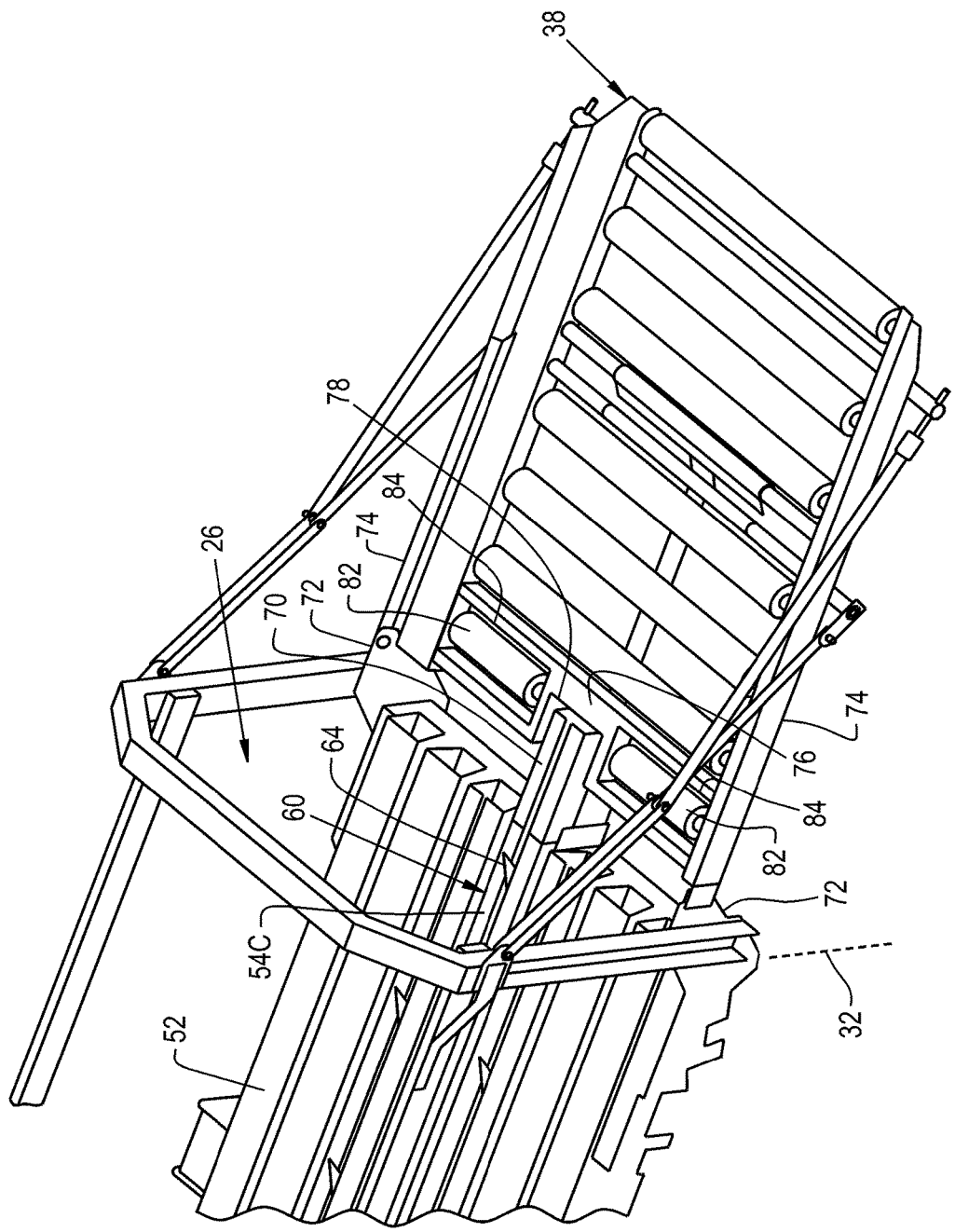
FIG. 9 illustrates yet another embodiment of a bale ejection system of the present invention, attached to the discharge chute at the rear of the baler.

Referring now to FIG. 9, there is shown another embodiment of the bale ejection system 60 of the present invention. In this embodiment, the bale ejection system 60 is likewise configured as a partial bale ejection system, and the extension 70 is a separate piece that is attached to the center floor slat 54C. In this embodiment, the cross member 76 is configured as a C-shaped plate having a cutout 78 which receives the extension 70 therein. Additionally, the cross member 76 also includes a pair of rollers 82 which are mounted within cutouts 84 and rotatably carried by the plate 76. The particular size and shape of the cutouts 84 and rollers 82 can vary dependent on the particular application.

Figure 10:
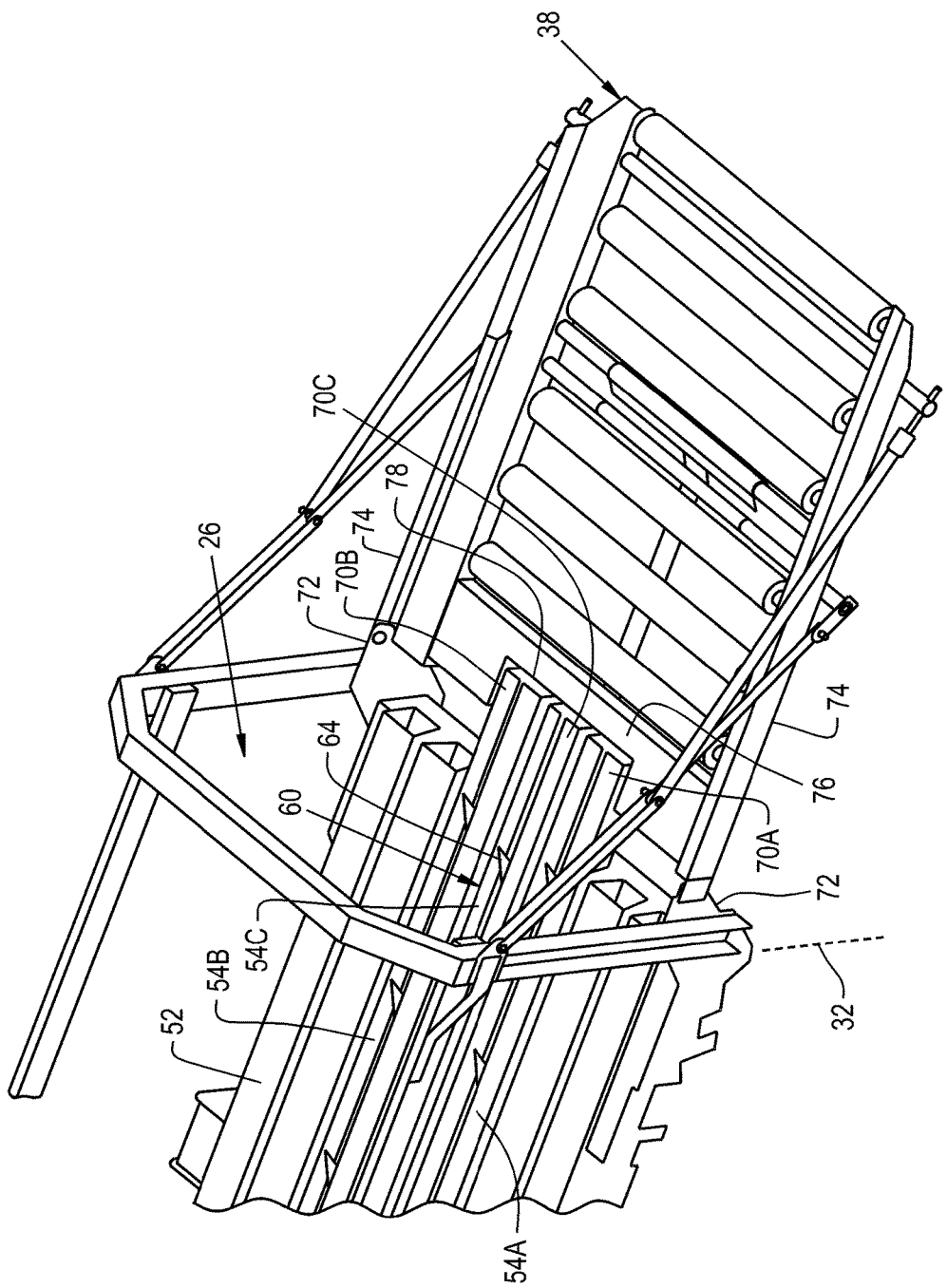
FIG. 10 illustrates still another embodiment of a bale ejection system of the present invention, attached to the discharge chute at the rear of the baler.

Referring now to FIG. 10, there is shown yet another embodiment of the bale ejection system of the present invention. In this embodiment, each of the slats 54A, 54B and 54C includes an integral extension 70A, 70B, and 70C which extends rearward of the outlet 32. The cross member 76 is configured as a C-shaped plate having a cutout 78 which receives all three of the extensions 70 therein.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. An agricultural baler comprising:
   a main bale chamber for compressing crop material into bales, the main bale chamber comprising a floor and an outlet for discharge of compressed crop material in bales;
   a bale ejection system incorporated in the floor, the bale ejection system being arranged to move and eject a rearward-most bale proximate to the outlet of the main bale chamber, wherein the bale ejection system extends longitudinally past the outlet of the main bale chamber; and
   the floor comprises a plurality of floor slats extending side by side toward the outlet and the floor terminates at a rearward end adjacent to the outlet of the main bale chamber, and the bale ejection system comprises at least one tine pivotally mounted to an extension/retraction device and at least one extension associated with at least one of the floor slats, the at least one extension extending longitudinally past the rearward end of the floor, wherein the at least one tine and the extension/retraction device are displaceable within and along the at least one extension from a position rearward of the outlet and outside of the main bale chamber to a position before the rearward end of the floor and inside the main bale chamber.

2. The agricultural baler of claim 1, wherein the extension is integral with the at least one floor slat, or separate from and attached to the at least one floor slat.

3. An agricultural baler comprising:
a main bale chamber for compressing crop material into bales, the main bale chamber comprising a floor and an outlet for discharge of compressed crop material in bales; and
a bale ejection system incorporated with the floor, the bale ejection system configured to move and eject a rearward-most bale proximate to the outlet of the main bale chamber, wherein the bale ejection system continuously extends longitudinally past the outlet of the main bale chamber;
the floor comprising a plurality of floor slats positioned side-by-side to each other and extending toward the outlet and the floor terminates at a rearward end adjacent to the outlet of the main bale chamber, and the bale ejection system comprising at least one extension associated with at least one of the floor slats, the at least one extension extending longitudinally past the rearward end of the floor, wherein the at least one extension is integral with the at least one floor slat, or separate from and attached to the at least one floor slat; and
a discharge chute positioned at the outlet of the main bale chamber for receiving a bale from the bale ejection system, the discharge chute comprising a pair of space apart side rails and a cross member extending between the side rails adjacent to the outlet of the main bale chamber, the cross member being configured to accommodate the at least one extension which extends past the rearward end of the floor.

4. The agricultural baler of claim 3, wherein the cross member comprises a plate having at least one cutout which receives the at least one extension therein.

5. The agricultural baler of claim 4, wherein the cutout is generally rectangular shaped as viewed from a top of the plate top.

6. The agricultural baler of claim 3, wherein the cross member comprises a plate having at least one cutout, the at least one cutout being configured to receive at least one roller or the at least one extension therein.

\* \* \* \* \*